United States Patent [19]

Li et al.

[11] 4,292,181

[45] Sep. 29, 1981

[54] USE OF LIQUID MEMBRANE SYSTEMS FOR SELECTIVE ION TRANSFER

[75] Inventors: Norman N. Li, Edison; Robert P. Cahn, Millburn; Adam L. Shrier, Montclair, all of N.J.

[73] Assignee: Exxon Research & Engineering Co., Florham Park, N.J.

[21] Appl. No.: 161,602

[22] Filed: Jun. 20, 1980

Related U.S. Application Data

[60] Continuation of Ser. No. 955,957, Oct. 30, 1978, abandoned, which is a continuation of Ser. No. 699,707, Mar. 23, 1976, abandoned, and a continuation-in-part of Ser. No. 404,716, Oct. 9, 1973, abandoned, which is a division of Ser. No. 174,990, Aug. 25, 1971, Pat. No. 3,779,907, which is a continuation-in-part of Ser. No. 28,094, Feb. 13, 1970, Pat. No. 3,617,546, and a continuation-in-part of Ser. No. 36,686, May 5, 1970, Pat. No. 3,637,488.

[51] Int. Cl.$^3$ .......................... B01D 13/00; C02F 1/28
[52] U.S. Cl. ................................. 210/638; 210/643; 210/912; 210/913; 210/914; 423/24
[58] Field of Search ............... 210/634, 638, 643, 644, 210/649, 665, 684, 688, 912–914; 252/303, 314, 188.3 R, 309; 423/24, 54, 100

[56] References Cited

U.S. PATENT DOCUMENTS

| | | | |
|---|---|---|---|
| 2,299,693 | 10/1942 | Green | 252/188.3 R |
| 3,057,804 | 10/1962 | Berkeley et al. | 252/118 |
| 3,617,546 | 11/1971 | Li et al. | 21/638 |
| 3,637,488 | 1/1972 | Li et al. | 210/643 X |
| 3,714,062 | 1/1973 | Askew et al. | 252/309 |
| 3,719,590 | 3/1973 | Li et al. | 208/308 |
| 3,779,907 | 12/1973 | Li et al. | 210/643 X |

OTHER PUBLICATIONS

Frankenfeld et al., "Wastewater Treatment by Liquid Ion Exchange, etc.", *Recent Devep. in Sep. Sciences*, vol. 3, pp. 285–292.
Li, "Facilitated Transport Through Liquid Membranes, etc." *J. Membrane Science*, vol. 3, pp. 265–269 (1978).
Schiffer et al., "Concentrating Solutes with Membranes Containing Carriers," *Nature*, vol. 250, pp. 484–486 (Aug. 1974).
Cahn et al., "Separation of Phenols from Waste Water by the Liquid Membrane Technique", *Separation Science*: 9(6), pp. 505–519 (1974).
Kitagawa et al., "Wastewater Treatment by Liquid Membrane Process", *Env. Sci & Tech.*, vol. 11, pp. 602–605 (Jun. 1977).
Frankenfeld et al., "Liquid Membrane Systems", *Ion Exchange for Pollution Control*, vol. II, pp. 163–172 (CRC Press, 1979).

*Primary Examiner*—Thomas G. Wyse
*Attorney, Agent, or Firm*—Edward M. Corcoran

[57] ABSTRACT

In a liquid membrane process for removing ions from solution which comprises contacting a feed solution containing a first ion with an emulsion, said emulsion comprising an external phase which is immiscible with said solution and contains a complexing agent, said complexing agent being capable of forming a first complex with said first ion, which is soluble in said external phase, and an internal phase, the improvement which comprises providing a second ion, in the internal phase, of the emulsion, said second ion being capable of converting said first complex to a second complex by replacing said first ion in said first complex, said second complex being also soluble in said external phase, whereby the first ion diffuses from said solution into said internal phase, and said second ion diffuses from said internal phase into said solution. More particularly, the instant invention comprises maintaining the concentration of the second ion, in the feed solution, at a sufficiently low level to allow formation of the first complex at the interface of the external phase of the emulsion and the solution, and maintaining the concentration of the second ion, in the internal phase of the emulsion at a concentration, sufficiently high, to convert said first complex into a second complex. Preferably, the first ion is a metal ion—for example, copper, or a complex ion, such as $H_gCl_4{=}$ comprising a metal constituent and said second ion is either hydrogen or hydroxyl ion.

18 Claims, No Drawings

USE OF LIQUID MEMBRANE SYSTEMS FOR SELECTIVE ION TRANSFER

CROSS-REFERENCE TO RELATED APPLICATIONS

This application is a continuation of U.S. Ser. No. 955,957 filed Oct. 30, 1978, abandoned, which is a continuation of U.S. Ser. No. 699,707 filed Mar. 23, 1976, abandoned, as a continuation-in-part of U.S. Ser. No. 404,716 filed Oct. 9, 1973, abandoned, which in turn is a division of U.S. Ser. No. 174,990 filed Aug. 25, 1971, now U.S. Pat. No. 3,779,907, issued Dec. 18, 1973. U.S. Ser. No. 174,990 inturn is a continuation-in-part of U.S. Ser. No. 28,094 filed Feb. 13, 1970, now U.S. Pat. No. 3,617,546 issued Nov. 2, 1971, and U.S. Ser. No. 36,686 filed May 5, 1970, now U.S. Pat. No. 3,637,488 issued Jan. 25, 1972.

FIELD OF THE INVENTION

In a liquid membrane process for removing ions from solution which comprises contacting a solution containing a first ion with an emulsion, said emulsion comprising an external phase which is immiscible with said solution and contains a complexing agent, said complexing agent being capable of forming a first complex with said first ion, said first complex being soluble in said external phase, and an internal phase, the improvement which comprises providing a second ion in the internal phase of the emulsion, said second ion being capable of converting said first complex to a second complex by replacing said first ion in said first complex, said second complex being also soluble in said external phase, whereby the first ion diffuses from said solution into said internal phase, and said second ion diffuses from said internal phase into said solution. More particularly, the instant invention comprises maintaining the concentration of the second ion in the solution at a sufficiently low level to allow formation of the first complex at the interface of the external phase of the emulsion and the solution, and maintaining the concentration of the second ion in the internal phase of the emulsion at a concentration sufficiently high to convert said first complex into a second complex. Preferably, the first ion is a metal ion-for example, copper, or a complex ion comprising a metal constituent such as $HgCL_4$ and said second ion is either hydrogen or hydroxyl ion. From the two examples of the preferred embodiment, it is clear that the metal may be in either a cationic or anionic form. The complexing agent is generally an oil-soluble ion-exchange material-for example, an amine or oxime which is insoluble in the aqueous solution and preferably also insoluble in the internal phase of the emulsion. In a preferred embodiment of the instant invention, a relatively high pH, i.e. low-acidity copper solution (a pH of from 1.5 to 3.5) is contacted with an emulsion comprising as the external phase a hydroxyoxime dissolved in a hydrocarbon, and as the internal phase of an aqueous solution having a high hydrogen ion concentration (that is, a pH of less than 0.5, i.e. an acid concentration of 30 g/l $H_2SO_4$ or more) at mild agitation conditions whereby the cupric ions complex with said hydroxyimine, permeate through the external phase of the emulsion, and are trapped in the internal phase by the conversion of the copper complex to the hydrogen complex in the presence of the high acidity.

DESCRIPTION OF THE PRIOR ART

The removal of specific ions or compounds from dilute aqueous solution and concentrating them in another aqueous phase is desirable in many metallurgical and waste water treating processes. Processes which have been used or suggested towards this goal, and which reflect on the present invention, are the following:

1. Extraction into an organic phase which may contain a complexing or ion exchange agent followed by reextraction into another aqueous phase having a high concentration of another ion of the same polarity.

2. Liquid membrane permeation with a membrane which allows permeation of the specific ions or compounds in one form, followed by reaction with a dissolved chemical encapsulated as an aqueous phase inside the membrane so as to convert the permeating ions or compounds into a nonpermeating species, i.e. by neutralization or precipitation. See, for example, U.S. Pat. Nos. 3,617,546 and 3,637,488.

SUMMARY OF THE INSTANT INVENTION

In a liquid membrane process for removing ions from solution which comprises contacting a feed solution containing a first ion with an emulsion, said emulsion comprising an external phase which is immiscible with said feed solution and contains a complexing agent, said complexing agent being capable of forming a first complex with said first ion, said first complex being soluble in said external phase, and an internal phase, the improvement which comprises providing a second ion in the internal phase of the emulsion, said second ion being capable of converting said first complex to a second complex by replacing said first ion in said first complex, said second complex being also soluble in said external phase, whereby the first ion diffuses from said feed solution into said internal phase, and said second ion diffuses from said internal phase into said feed solution. Thus, the process of the instant invention does not convert the first ion into a nonpermeable form in the internal phase of the emulsion as is the case for the processes in U.S. Pat. Nos. 3,617,546 and 3,637,488. Instead, the first ion is maintained in the internal phase in a permeable form chemically identical to the form in which it exists in the feed solution. More particularly the instant invention comprises maintaining the concentration of the second ion in the feed solution at a sufficiently low level to allow formation of the first complex at the interface of the external phase of the emulsion and the solution, and maintaining the concentration of the second ion in the internal phase of the emulsion at a concentration sufficiently high to convert said first complex into a second complex. The first ion is preferably a metal ion in either a cationic or anionic form—for example, cupric ion or a complex ion, comprising a metal component such as $HgCL_4$. Ions may be removed from aqueous solutions and accumulated within water-in-oil emulsions by means of this process. To remove metal ions, a complexing agent—for example, an oil-soluble ion-exchange compound, is provided in the external, i.e. membrane, phase of the water-in-oil emulsion. The ion-exchange compound will be selected to be able to combine selectively with metal ion in a manner functionally related to the presence of a second ion—for example, hydrogen ion, in the aqueous solution. In the case of cupric ion, the ion-exchange compound may be selected from the group consisting of aromatic and aliphatic hydroxyoximes and quinolines, amines and other nitrogen compounds. In the case of other ions, those skilled in the art will be able to select the ion-exchange compound in accordance with the chemical identity of the ion which is to be removed and the principles of the invention disclosed herein.

Preferably, for removing copper, the ion-exchange compound is a mixture of β-hydroxy benzophenone oxime (LIX 65N) and α-hydroxy oxime (LIX 63) which make up the proprietary mixture known as LIX 64N marketed by General Mills Chemical Co. Materials of this nature will combine with cupric ions at high pH's, that is at pH$^-$ 1 or higher (or a H-ion concentration of 0.1 molar) and release the cupric ion at hydrogen ion concentrations above that value, preferably at 25–200 g/l $H_2SO_4$.

Actually, the ion-exchange compounds exist in equilibrium with cupric as well as hydrogen ions according to the following equations:

$$Cu^{++}{}_a + 2[HA]_o \rightleftharpoons [CuA_2]_o + 2 H^+{}_a$$

where:

$Cu^{++}{}_a$ = cupric ion in the aqueous phase
$[HA]_o$ = hydrogen form of the ion exchange compound, in the organic phase
$[CuA_2]_o$ = copper form of the ion exchange compound, in the organic phase
$H^+{}_a$ = hydrogen ion in the aqueous phase From this equilibrium equation, which, in general, obeys the equilibrium rule $$\text{equilibrium constant} = K = \frac{[CuA_2]_o \cdot [H^+]_a{}^2}{[Cu^{++}]_a \cdot [HA]_o{}^2}$$

where [ ] represents the molar concentrations of the above constituents in their respective phases.

From these equations it is apparent that the fraction of the ion exchange compound which is in the Cu-form is very dependent on the H-ion concentration, the higher the [H$^+$], the less will be [CuA$_2$]$_o$ and vice versa.

The actual H$^+$-ion concentration range over which a specific ion exchange compound will be effective (i.e. how low does [H$^+$] have to be to get a substantial fraction of the resin into the CuA$_2$-form, and how high does the [H$^+$] have to go to make most of the CuA$_2$ reconvert to the HA-form, thus releasing the complexed Cu$^{++}$) depends very much on the K of the material or mixture of resins involved. In the case of LIX 64N and copper, for example, CuA$_2$ formation is favored at pH above about 1, and its reversion to the HA+Cu$^{++}$ form is favored when the stripping solution (i.e. internal emulsion phase) has an acid content of 25–30 g/l H$_2$SO$_4$ and higher. Preferably, for effective stripping, H$_2$SO$_4$ concentrations should be 100–175 g/l.

With other LIX systems, effective complexing occurs at acid concentrations as high as 30–100 g/l H$_2$SO$_4$, while the complex of Cu and the ion-exchange resin will reconvert to the H-form at acid concentrations of 250–300 g/l.

It is important to note that Cu-transfer via the ion-exchange containing oil membrane will take place from a region of lower to a region of higher Cu-concentration provided the hydrogen ion concentration differences are in the opposite direction. The precise or optimum levels of Cu and H concentrations will depend on the specific ion exchange compound used.

The above discussion is exemplary, and it must be appreciated that other metal or metal-containing ions, and second ions other than H-ion, function similarly. Other suitable second ions such as OH$^-$, Cl$^-$, SO$_4$$^=$, Na$^+$, may be used to drive metallic and metal-containing ions from regions of low concentration through the liquid membrane into regions of high concentration, provided suitable oil-soluble ion-exchange compound are employed (either cation or anion exchange type).

The external phase of the emulsion will also contain a solvent for said ion-exchange compound, although an ion-exchange compound which is a liquid at the temperature at which the process is carried out may be used neat, and desirably a surface active agent to promote stability of the emulsion. Solvents which are useful in the process of the instant invention must be immiscible with the aqueous solution and capable of dissolving the desired ion-exchange compound. Furthermore, the solvent must be such that a stable emulsion may be prepared since the stability of the emulsion is critical to the success of the process of the instant invention. Solvents which are suitable in general for preparing the emulsions used in the instant process include hydrocarbon liquids, chlorinated hydrocarbons, etc. The ion-exchange compound, while having a certain amount of surface activity, is generally combined with a surfactant in such emulsion. This surfactant may be selected from those known in the art provided it is stable under the conditions of operation of the instant process. For example, in one of the most preferred embodiments of the instant invention, the second ion, which, as further explained herein, is necessary, after complexing of the first ion and the ion-exchange compound at the interface of the aqueous solution and the external phase of the emulsion, to provide decomplexing in the internal phase of the emulsion, is a hydrogen ion. In this preferred embodiment, the surfactant must be capable of providing stable emulsions and also stable to highly acidic environments. In general, the various surface-active agents and solvents which are useful in the process of the instant invention as well as many of the ion-exchange compounds are disclosed in U.S. Pat. No. 3,779,907 herein incorporated by reference.

In the internal phase of the emulsion, the concentration of the second ion is maintained at a level which promotes decomplexing of the first ion with the ion-exchange compound. For example, in the case of cupric ion and LIX 64N the complex is formed at conditions of high pH—that is, a pH of greater than 1. This complex, however, is unstable in the presence of very low pH's—for example, a pH of less than 0.5. Using this as an example of the process of the instant invention, the pH of the internal phase of the emulsion is maintained at less than 0.5, preferably at acid concentrations of 100–200 g/l H$_2$SO$_4$, whereby, at the interface of the internal phase and the external phase of the emulsion, the complex is destroyed leaving cupric ion trapped in the internal phase of the emulsion.

In the process of the instant invention an emulsion is formed having all of the necessary characteristics described above, i.e. since in general the emulsions are used to treat aqueous solutions, a water-in-oil (that is, an emulsion wherein the internal phase is aqueous and the external phase is oil) is prepared. This emulsion may be prepared by means known in the art—for example, the aqueous phase which may be a sulfuric acid solution having an acid concentration above 100 g/l is added over a period of time to an agitating solution comprising an ion-exchange compound such as LIX 64N dissolved in a hydrocarbon oil—for example, an isoparaffin oil having a carbon number range of from $C_{10}$ to $C_{60}$, and containing therein a surface-active agent—for example, the polyamine derivative of page 22 below. The sulfuric acid solution is added in an amount sufficient to provide an emulsion, whereof the sulfuric acid solution makes up approximately 50 weight percent. This stable emulsion may be contacted with an aqueous solution containing dissolved copper sulfate—for example, from 0.2 to 10 grams of salt per liter. This copper sulfate solution should have a pH of at least 1, preferably at least 2 to 3. The aqueous solution and the emulsion may be contacted by means known in the art—for example, contacting in one or more extraction mixers or in static mixers followed by settlers may be used. For the purposes of example, however, aqueous solutions and the emulsion are contacted in a batch operation. The emulsion, being a water-in-oil emulsion, is not miscible with the aqueous solution and thus, depending on the respective specific gravity, will either float on the aqueous solution or the aqueous solution will float on it. Mild agitation is provided in order to break up the emulsion into droplets which will be dispersed by said agitation in said aqueous solution. The volume ratio of the aqueous solution to the emulsion may vary from 30/1 to 1/1, preferably 15/1 to 2/1. The individual droplets of the emulsion provide what has been termed a "liquid membrane"—that is, the external phase of the emulsion, i.e. the oil, interfaces with the aqueous feed solution. At this interface, cupric ion is complexed with the ion-exchange compound dissolved in the external phase to form an oil-soluble complex. This soluble complex permeates through the external phase to the interface of the internal phase and the external phase of the emulsion. At this interface, because of the low pH of the internal phase, the complex is not stable and decomposes yielding the complexing agent and cupric ion. The cupric ion being soluble in the aqueous internal phase but not in the external phase of the emulsion will be dissolved therein. The cupric ion is thus trapped in the internal phase of the emulsion. At the interface of the internal phase and the external phase of the emulsion, the complexing agent will combine with a hydrogen ion since this form is favored in the presence of a high hydrogen ion concentration. The hydrogen ion containing species will then permeate back to the interface of the external phase of the emulsion and the aqueous feed solution where it is available for further complexing with cupric ion present in the aqueous solution. It may be thus seen from this description that the external phase of the emulsion, i.e. the liquid membrane, acts as a one-way transfer means for the cupric ion and a countercurrent one-way transfer means for hydrogen ion. Thus it is possible by means of the process of the instant invention to transfer ions—for example, metal ions such as copper—from an aqueous feed solution to the internal phase of the emulsion even though the concentration of said ion is higher in the internal phase than in the aqueous solution. This will thus overcome one of the limitations of the prior art liquid membrane processes.

The reason for transfer of the complex through the external phase of the emulsion, i.e. the liquid membrane, is due to the concentration difference in the external phase itself. At the interface of the external phase of the emulsion and the aqueous feed solution there exists a high concentration of the complex of the ion-exchange compound and the ion—for example, cupric ion, while at the interface of the external phase of the emulsion and the internal phase where due to high acidity, the complex is destroyed, there exists a low concentration of the cupric ion ion-exchange compound complex. At this interface, of course, the concentration of the hydrogen ion combined with the ion-exchange compound will be higher than at the interface of the aqueous feed solution and the external phase of the emulsion. Due to this concentration difference, what occurs is a permeation of the cupric ion combined with the ion-exchange compound from the aqueous feed solution to the internal phase of the emulsion while the complex of the hydrogen ion in the ion-exchange compund permeates from the internal phase of the emulsion to the aqueous solution. It can thus be seen that the pH of the aqueous feed solution will continue to decrease, due to an influx of hydrogen ions carried across the membrane from within the emulsion countercurrent to the copper ions being carried in, while the concentration of copper ion in the aqueous feed solution decreases. For this reason, in this example, the pH of the aqueous solution must be maintained above a certain level. This can be done by means known in the art such as adding a basic solution—for example, sodium hydroxide—to the aqueous solution during the process or providing sufficient basicity initially to promote the permeation of the copper from the aqueous solution into the internal phase of the emulsion. The internal phase of the emulsion, of course, must be maintaind at a pH wherein decomplexing occurs. This can be done merely by providing sufficient acid concentration in the initial emulsion to provide a sufficiently low pH over the course of removing the copper ion from the aqueous solution, so that the acid concentration never goes below 50–100 g/l $H_2SO_4$.

The process of the instant invention is specifically applicable to removal of the metal ion from aqueous waste streams as well as aqueous solutions, such as result from hydrometallurgical operations. The process of the instant invention is especially applicable to the removal of copper from dilute leach liquors, which are obtained by treatment of copper containing minerals or mineral residues with dilute aqueous acid, such as sulfuric acid.

The resultant leach liquor will contain cupric ion in concentrations which may range from 0.25 g/liter up to 10 g/l or higher. This same liquor will, of course, also contain other dissolved ions such as iron, aluminum and magnesium, as well as any unused acid. It will be necessary to separate and concentrate the copper and transfer it into a highly acidic electrolysis solution with a minimum of interfering foreign metallic ions. Pure metallic copper is recovered from this liquid by electrolysis.

In the conventional solvent extraction process, the leach liquor is contacted with a solution of an ion exchange compound or complexing agent, such as LIX 64N in kerosene, in one, but usually several, countercurrent mixer-settler stages. The cupric ion is thus extracted selectively down to the desired low level by means of the organic solvent, from which it is stripped in a subsequent operation by means of a highly acidic stripping solution, usually by the spent electrolyte from the electrolysis operation. Copper concentration in this liquor is 30–60 g/l, while acid may range from 100–200 g/l, expressed as $H_2SO_4$. The transfer of Cu from the dilute leach liquor at 0.25–10 g/l to the concentrated electrolysis solution, wherein Cu concentration is of the order of 30–60 g/l, is made possible by the wide difference in acid concentration between the two aqueous solutions, namely about 0.2–0.5 g/l acid in the leach liquor and 100–200 g/l acid in the stripping solution.

However, one of the disadvantages of the conventional process is that, since the capacity of the organic phase for copper is relatively low (0.5–2 g/l of Cu, approx.) very large quantities of solvent must be circulated, mixed, settled and stripped, with a resultant high inventory cost. Also, the driving force for copper transfer is rather small between the two phases at any given stage, resulting in high contacting requirements (i.e. strong agitation and long mixing time).

In the process of the instant invention, the stripping solution (strongly acidic aqueous electrolyte, for example) is incorporated into the extracting emulsion as the internal aqueous droplet phase. It may have a copper concentration from 25–60 g/l and an acid concentration between 30 and 200 g/l, preferably between 100 and 175 g $H_2SO_4$/l. The external emulsion phase is a hydrocarbon phase incorporating 0.5–20% or more of LIX 64N, preferably 1–10%, so as to accomplish the desired selective transfer of cupric ions from the dilute leach liquor into the internal emulsion droplets.

The emulsion formulation may range from 0.3/1 to 3.0/1 wt./wt. oil/aqueous (i.e. external/internal) with a range of 0.5/1–2/1 being preferred.

The emulsion is contacted with the leach liquor feed solution in a single mixer-settler stage where the copper is extracted out of the aqueous feed by means of the liquid membrane emulsion. Since the "stripping solution" is incorporated in the emulsion, the driving force for good copper removal from the leach liquor is always present and the need for countercurrency is obviated. Therefore, only a single settling stage is required.

However, in order to maximize the rate of copper extraction, it is preferable to subdivide the mixing reactor into several co-current stages. This results in a decreasing copper concentration in the aqueous phase present in the various stages, leading to improved extraction rates compared to a single contacting stage. This is well-known first order reaction technology, and copper extraction by liquid membranes appears to follow first order kinetics reasonably well.

In the instant invention, the ion exchange resin or complexing agent is only used to transfer ions from the solution to the internal phase of the emulsion, thus much less amounts are necessary than in the prior art solvent extraction processes wherein the ion exchange compound or the complexing agent remains chemically tied (reacted) to the ion. Thus, since the copper concentration in the internal phase of the emulsion can increase by 10–20 g Cu/l between "fresh" and "spent" emulsion, and the internal to external ratio in the emulsion may be 1/1 to 2/1, the copper capacity of the emulsion will be 5–13 g/l, up to 10-fold (or more) of the capacity of the kerosene-LIX System. Also, the copper driving force is always better, so that much smaller equipment and lower circulation are possible. Finally, organic losses in the effluent treated leach liquor can be lower.

In a typical installation, 57,000 gpm of leach liquor containing 0.5 g/l of Cu as well as g/l quantities of Fe, Al, Mg and other ions is treated at pH of 2.5 with only 4000 gpm of a liquid membrane emulsion in which the aqueous/oil phases are in the weight ratio of 2/1. The oil phase contains 5% LIX 64N, and the remainder is a mixture of $C_{10}$–$C_{40}$ hydrocarbons and a polyamine derivative (see example I below). The internal aqueous phase contains 165 g/l $H_2SO_4$ and 30 g/l Cu. This copper concentration is allowed to rise to 40 g/l as the copper concentration of the treated leach liquor drops to 10% of the feed value, i.e. 0.05 g/l Cu.

The spent emulsion and treated leach liquor are separated in a settler and the leach liquor is recycled to the leaching operation. The spent emulsion is now processed to recover the copper values concentrated therein.

This recovery can be achieved in a number of ways, some of which are described below.

1. Demulsification by treatment with emulsion-breaking solvents, i.e. a mixture of an oil-soluble and water-soluble solvent such as cyclohexane and isopropanol. (See, for example U.S. Ser. No. 525,204, filed Nov. 19, 1974, in the name of Li, Hucal and Cahn.)

2. Demulsification by physical means including centrifugation and vigorous agitation with an aqueous phase. (See U.S. Pat. No. 4,125,461 granted on Nov. 14, 1978.)

3. Re-extraction of the contained copper from the internal phase by means of an aqueous solution which is higher in acid strength than the encapsulated internal aqueous phase.

4. Electrolysis of the emulsion dispersed in a strongly acidified aqueous phase, which is acting both as the electrolyte and as the stripping liquor similar to 3 above.

The aqueous internal phase separated out in either 1 or 2 above can be fed directly to electrolysis, where Cu is removed to the desired level, and $H_2SO_4$ will build up to the required concentration. This regenerates the internal solution to the required level, at which point it is recombined with the previously separated oil phase to form fresh emulsion for recycle to the extraction step.

The emulsions after 3 or 4 above can be recycled directly to the extraction step.

Other techniques for breaking the liquid membrane emulsion include heat, passing the emulsion through a high shear zone in te presence of finely divided coalescing material which wets the internal phase preferentially, as well as the above-mentioned alternates.

The demulsification via centrifugation (see 2 above) is carried out by first centrifuging the spent emulsion to separate out as much of the external phase (oil) as possible. The remaining thickened emulsion, which now has a ratio of 1/5 to 1/10 or less oil aqueous (i.e. external-/internal phase) is then agitated with excess internal aqueous phase in a high shear zone where this thick emulsion will break to a sufficient degree to release a major portion of its contained internal aqueous phase. By appropriate recycling through the centrifuge, the incoming emulsion can thus be broken, and the internal phase treated (in the electrolytic cell, for example) and recombined with the previously separated oil phase to form fresh emulsion for leach liquor treating, as previously described.

It is to be understood that other methods of demulsification, such as by passage through the intense electrical field or by the addition of appropriate emulsion breaking chemicals, may be utilized without detracting from the main intent of the instant invention, namely the selective removal of ionic species by means of ion exchange containing liquid membrane emulsions and the concomitant use of a second ion as a "driver".

In waste treatment processes, such as the removal of trace quantities of metallic contaminants, the process of the present invention can be very effectively utilized. By the use of a selective ion exchange resin dissolved in the external phase (oil), and by the inclusion of a high concentration of driver ion ($H^+$, $OH^-$, $Cl^-$, etc.) into the internal aqueous droplet phase, emulsions can very effectively clean up even small amounts of metallic impurities from dilute effluents and concentrate these metallic materials selectively in the internal phase of the emulsion. Concentration differences of many thousand-fold between the solution and internal aqueous phases can be maintained so that very low levels (parts per billion) of metallic contaminants can be reached in the waste water being treated while the emulsion is being loaded to a considerable degree (several percent) with the contaminant. Since the quantity of emulsion used up often is very small, the emulsion can be burned or otherwise disposed of at less expense than by going through one of the previously described recovery techniques.

Typical waste water contaminants which can be handled by this technique are Hg, Co, Cr and, of course, Cu, to name but a few.

EXAMPLE 1

Three runs were made using three different liquid membrane compositions to show the effective removal of $Cu^{++}$ from aqueous solutions by the process of the instant invention. The data are summarized in the following table.

In carrying out each of the three runs, a copper stripping solution comprised of 17.2% $H_2SO_4$ and 2.9% $Cu^{++}$ was first emulsified in a hydrocarbon solvent, containing dissolved therein a surfactant, said hydrocarbon solvent thus forming the liquid membrane phase according to the procedure described previously. The emulsion was then mixed with an aqueous solution of copper sulfate in a fluted round-bottom vessel, which has a volume of 1500 cc and an inside diameter of 4 in. The mixing was carried out by using a stirrer having two marine-type propellers each with three blades. The distance between the center of the stirrer shaft and the blade tip measured 1 in. One blade was mounted at the end of the stirrer shaft, the other was 1 in. above the first. Both blades were pitched in the same direction.

The mixing was stopped at 2, 5 and 10 minutes total mixing time to enable samples to be taken from the feed phase (aqueous solution of $Cu^{++}$) for Cu analysis and pH measurement. The results show that after 5 min. mixing the percent of Cu removal by the liquid membrane emulsion was excellent—ranging from 94 to 99%.

This example demonstrates the transfer of Cu from a solution comprising ~0.05% Cu to a solution comprising 2.9% Cu, by weight.

The physical properties of the three solvents used in formulating the liquid membrane phase of the emulsion used in the experiments are described below:

| Solvent | Carbon Number | % Aromatics | Sp.Gr. at 60° F. | Flash Pt. (°F.) | Kin. Vis. (c.s.) |
|---|---|---|---|---|---|
| S100N | ~35 | ~9 | .865 | 380 | 22.6 (100° F.) |
| S600N | ~40 | ~22 | .888 | 490 | 132 (100° F.) |
| IsoparM | ~20 | 0.2 | .784 | 170 | 3.14 (77° F.) |

| | Removal of $Cu^{++}$ by Liquid Membrane Emulsions | | | | | | | |
|---|---|---|---|---|---|---|---|---|
| | Run 1 | | | Run 2 | | | Run 3 | | |
| Mixing Time (Min.) | pH | ppm $Cu^{++}$ | % $Cu^{++}$ Removed | pH | ppm $Cu^{++}$ | % $Cu^{++}$ Removed | pH | ppm $Cu^{++}$ | % $Cu^{++}$ Removed |
| 0 | 2.49 | 520 | 0 | 2.52 | 465 | 0 | 2.50 | 450 | 0 |
| 2 | 2.24 | 158 | 69.6 | 2.13 | 15.5 | 96.7 | 2.13 | 9.5 | 97.9 |
| 5 | 2.13 | 31 | 94.0 | 2.00 | 4.8 | 99.0 | — | 6.5 | 98.6 |
| 10 | 2.04 | 10.0 | 98.1 | 1.94 | 7.8 | 98.3 | — | 9.8 | 97.8 |

Run Conditions:
Membrane Formulation (MF) for Run 1: S100N = 46%, S600N = 20%, LIX 64N (50% in S100N) = 30%, polyamine derivative 2 = 4%
MF for Run 2: Isopar M = 68%, LIX 64N (50% in Isopar M) = 30%, polyamine derivative 2 = 2%
MF for Run 3: Isopar M = 83%, LIX 64N (50% in S100N) = 15%, polyamine derivative 2 = 2%
Temperature = 40° C.
RPM = 390
Wt. of emulsion used to wt. of feed contacted: ¼ for Runs 1 and 3; 1/5 for Run 2.
Wt. ratio of membrane to internal phase (IP) = 1/1
IP = 172 g/liter $H_2SO_4$ and 29 g/liter $Cu^{++}$
Aqueous feed = ~500 ppm cubic centimeters of synthetic mine water
Polyamine derivative 2 is a mixture of

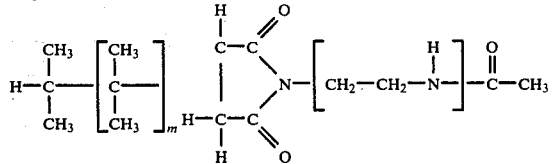

and

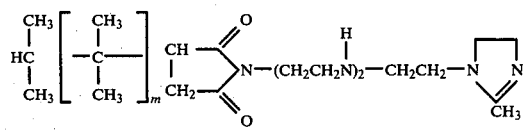

wherein m is an integer of about 40, giving said polyamine derivative a molecular weight of about 2000.

EXAMPLE 2

A run was made to show the rapid removal of $Cd(CN)_4^{-2}$ from its aqueous solution. The run consisted of three cycles. In each cycle, fresh food containing $Cd(CN)_4^{-2}$ was used; however, the liquid membrane emulsion used was the same for all three cycles. The purpose of making three cycles was to show the re-usability of the emulsion.

The equipment employed was the same as described in Example 1. The liquid membrane emulsion consisted of an internal phase ($Cd(CN)_4^{-2}$ stripping solution) and a membrane phase. The internal phase was a 3% HNO₃ in water, and the membrane phase contained Aliquat 336, the polyamine derivative of Example 1, tributyl phosphate, Isopar M, and S100N with their respective concentrations indicated in the following table. Aliquat 336 is a product from General Mills. It is a quaternary amine, $R_3HCH_3$, where R is a mixture of $C_8$ and $C_{10}$ carbon chains with the $C_8$ predominating. Tributyl phosphate was used here as a cosolvent to help dissolve Aliquat in S100N. The aqueous feed containing $Cd(CN)_4^{-2}$ was made by dissolving $CdCl_2$ and NaCN in water.

The results summarized in the table show excellent separation of $Cd(CN)_4^{-2}$ from its aqueous solution by the liquid membrane emulsion. The percent of Cd removed after 5 min. mixing in all three cycles ranges from 99.7 to 99.9%.

This example demonstrates the transfer of a metal in an anionic form through the liquid membrane into the internal phase.

Removal of $Cd(CN)_4^{-2}$ by Liquid Membrane Emulsions

| Mixing Time (Min.) | Cycle I | | | Cycle II | | | Cycle III | | |
|---|---|---|---|---|---|---|---|---|---|
| | pH | ppm $Cd^{++}$ | % $Cd^{++}$ Removed | pH | ppm $Cd^{++}$ | % $Cd^{++}$ Removed | pH | ppm $Cd^{++}$ | % $Cd^{++}$ Removed |
| 0 | 10.5 | 98 | 0 | 10.5 | 98 | 0 | 10.5 | 98 | 0 |
| 1 | 9.5 | 0.3 | 99.7 | 9.7 | 9.4 | 90.4 | 9.8 | 6.3 | 93.6 |
| 3 | 8.7 | 0.3 | 99.7 | 9.3 | 0.1 | 99.9 | 9.6 | 0.2 | 99.8 |

Run Conditions:
Membrane Formulation: 4.9% Aliquat, 4.9% polyamine derivative, 5.9% tributyl phosphate, 12.2% Isopar M, 72.1% S100N
Temperature = 25° C.
RPM = 390
Wt. of emulsion to wt. of feed contacted in each cycle = ½
Wt. ratio of membrane phase to internal phase (IP) = 2/1
IP = 3% HNO₃ in H₂O
Aqueous feed = 0.02% CdCl₂, 0.09% NaCN in H₂O.
All % are weight %.

What is claimed is:

1. In a liquid membrane process for removing ions from solution which comprises contacting a feed solution containing a first ion with an emulsion, said emulsion comprising an internal phase and an external phase which is immiscible with both said feed solution and internal phase, said external phase containing a complexing agent dissolved therein which forms an external phase-soluble first complex with said first ion whereby said first ion diffuses through the external phase to the internal phase, the improvement which comprises said internal phase containing a second ion therein at a concentration greater than in the feed solution which converts said first complex to a second complex with the second ion, thereby simultaneously releasing said first ion into said internal phase in a form which remains present therein in a form chemically identical to that in which it exists in the feed solution said second complex also being soluble in said external phase, whereby said second ion diffuses from said internal phase into said feed solution, said contacting occurring for a time sufficient for at least a portion of said first ion to be removed from said feed solution.

2. The process of claim 1 wherein said second ion is hydrogen.

3. The process of claim 2 wherein said first ion comprises a metal.

4. The process of claim 3 wherein said metal is copper.

5. The process of claim 1 wherein said complexing agent is an oil-soluble ion-exchange compound.

6. The process of claim 5 wherein said ion-exchange compound is hydroxyoxime.

7. The process of claim 5 wherein said first ion is copper.

8. The process of claim 7 wherein said ion exchange compound is a mixture of β-hydroxy benzophenone oxime and α-hydroxy oxime.

9. The process of claim 5 wherein said first ion comprises mercury.

10. The process of claim 5 wherein said first ion comprises chromium.

11. The process of claim 5 wherein said first ion comprises cadmium.

12. The process of claim 5 wherein said ion exchange compound is present in a concentration of about 0.5–20%.

13. The process of claim 1 including the feature of controlling the concentration of said second ion in said feed solution so as to maintain a sufficiently lower concentration thereof in said feed solution relative to the concentration of said second ion in said internal phase, thereby promoting the diffusion of said first ion to the internal phase and said second ion to the feed solution.

14. A process for removing cupric ion from an aqueous feed solution containing same which comprises contacting said feed solution with an emulsion having an internal aqueous phase containing hydrogen ions and an external oily phase containing a hydroxyoxime ion-exchange compound, said external phase being immiscible with both said feed solution and said internal phase, and wherein said ion exchange compound forms a complex with cupric ion at a pH of greater than about 1 to from a complex of said cupric ion and said ion-exchange compound at the interface of the feed solution and external phase to diffuse said cupric ion through the external phase to the internal phase of the emulsion wherein said cupric ion is released as cupric ion and wherein hydrogen ion in the internal phase replaces the cupric ion of the complex to form a hydrogen ion complex with the ion-exchange compound which then permits the hydrogen ion to diffuse back to the interface of the external phase and feed solution to release hydrogen ion into said feed solution and reform the cupric ion complex with the ion exchange compound, said contacting of the feed solution and emulsion being carried out while the pH of the feed solution is greater than about 1 and the pH of the internal phase is less than about 1.

15. The process of claim 14 wherein said internal phase comprises from 25 to 200 grams/liter H₂SO₄.

16. The process of claim 15 wherein said external phase contains a mixture of β-hydroxy benzophenone oxime and α-hydroxy oxime.

17. The process of claim 16 wherein said mixture is present in a concentration of from about 1–10%.

18. The process of claim 14 wherein a base is added to said feed solution in an amount sufficient to maintain the pH thereof at greater than about 1.

* * * * *